United States Patent

Gorrell et al.

[11] Patent Number: 5,487,241
[45] Date of Patent: Jan. 30, 1996

[54] WIND RESISTANT BUILDING SYSTEM

[76] Inventors: James E. Gorrell; David G. Gorrell, both of P.O. Box 60174, Fort Myers, Fla. 33906

[21] Appl. No.: 194,827

[22] Filed: Feb. 14, 1994

[51] Int. Cl.$^6$ .............................. E04H 1/00; E04B 1/00
[52] U.S. Cl. .............. 52/79.1; 52/92.1; 52/92.2; 52/293.3; 52/295; 52/298; 52/253; 52/259
[58] Field of Search ............. 52/587.1, 127.12, 52/90.1, 92.1, 92.2, 93.1, 292, 293.3, 295, 298, 250, 252, 253, 260, 79.1, 251, 259

[56] References Cited

U.S. PATENT DOCUMENTS

| | | | |
|---|---|---|---|
| 1,079,152 | 11/1913 | Stentzel | 52/250 |
| 2,347,756 | 5/1944 | Swenson | 52/293.3 |
| 3,258,888 | 7/1966 | Lum | 52/251 |
| 3,771,273 | 11/1973 | Brodie | 52/92.1 X |
| 4,127,971 | 12/1978 | Rojo, Jr. | 52/259 X |
| 4,231,199 | 11/1980 | Gomez et al. | 52/251 X |
| 4,632,346 | 12/1986 | Wilson | 52/295 X |
| 4,759,160 | 7/1988 | Fischer | 52/251 X |
| 4,909,001 | 3/1990 | Gonzalez Espinosa de los Monteros | 52/251 X |
| 4,982,538 | 1/1991 | Horstketter | 52/259 |
| 5,337,533 | 8/1994 | Kajita | 52/293.3 |

FOREIGN PATENT DOCUMENTS 0413495  4/1946  Italy ................................ 52/260

Primary Examiner—Wynn E. Wood
Attorney, Agent, or Firm—William E. Noonan

[57] ABSTRACT

A wind resistant concrete building is disclosed. The building includes a concrete base section and a wall section that has a plurality of discrete concrete wall panels. Each wall panel interengages and extends substantially perpendicularly from at least one other wall panel to reinforce the wall section. Each pair of interengaging wall panels are fastened together and the wall section is secured to the base. A precast concrete roof section including at least one roof panel mounted to the wall section and the roof section is attached to each of the wall panels.

15 Claims, 5 Drawing Sheets

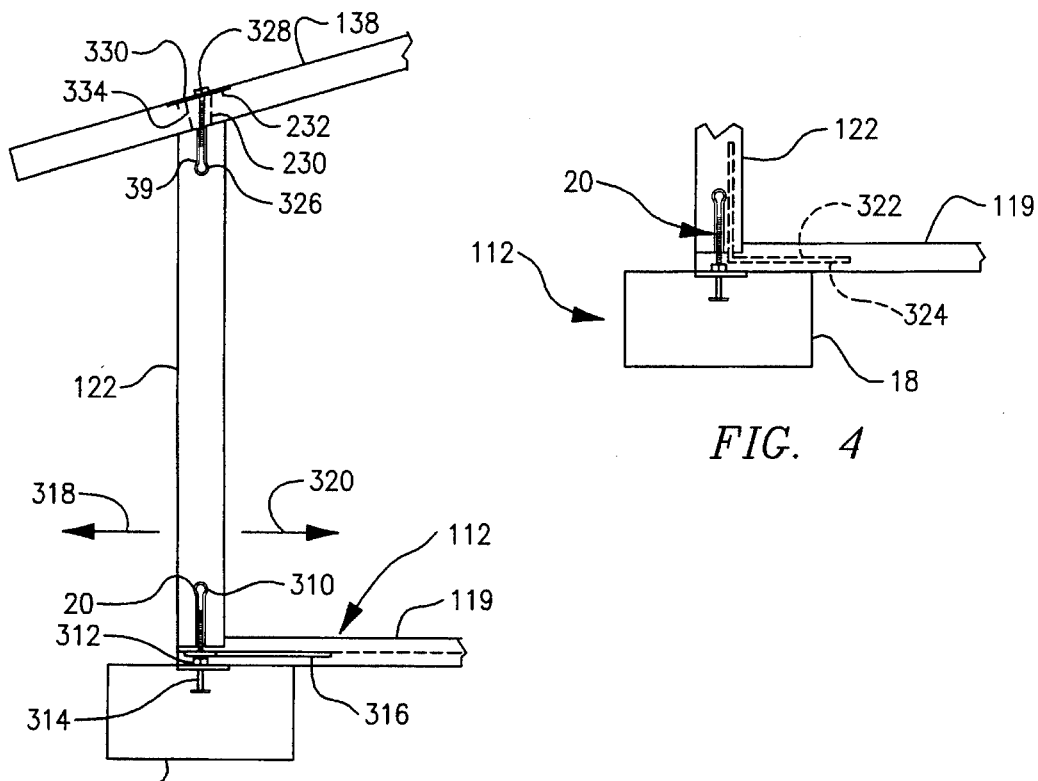
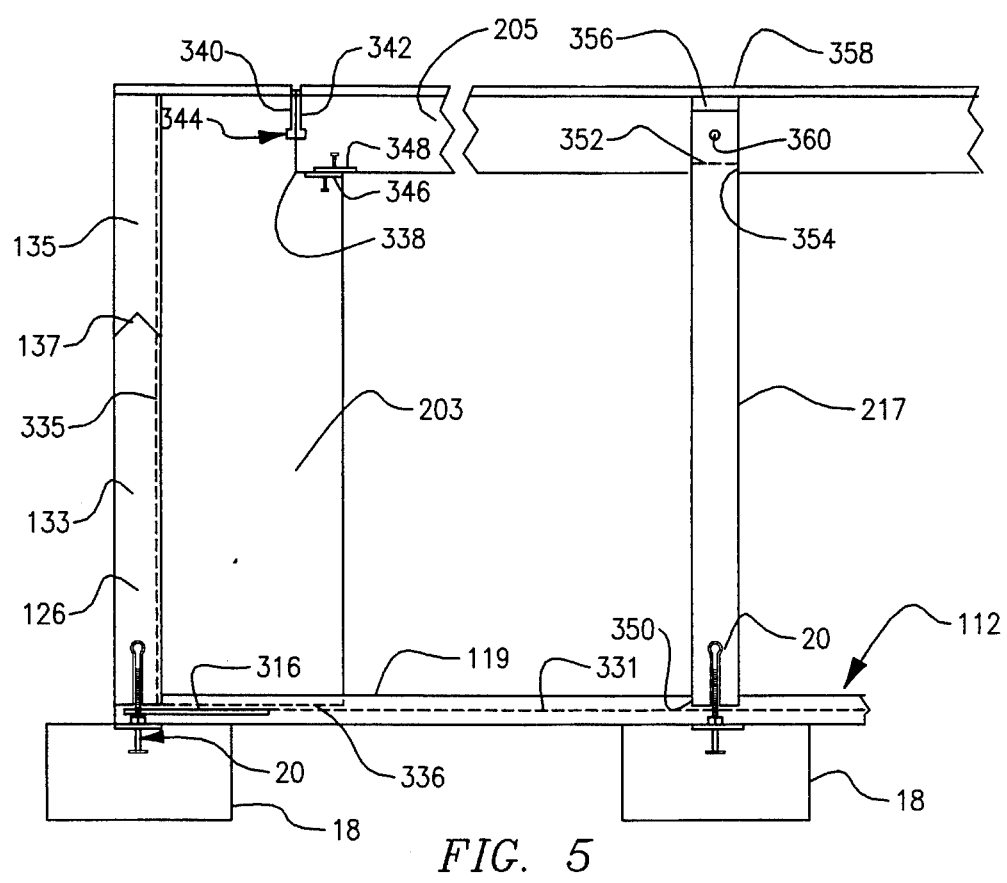

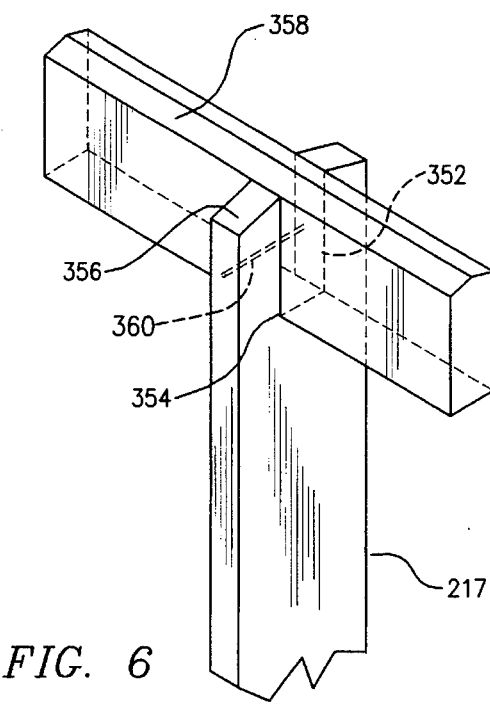
FIG. 6
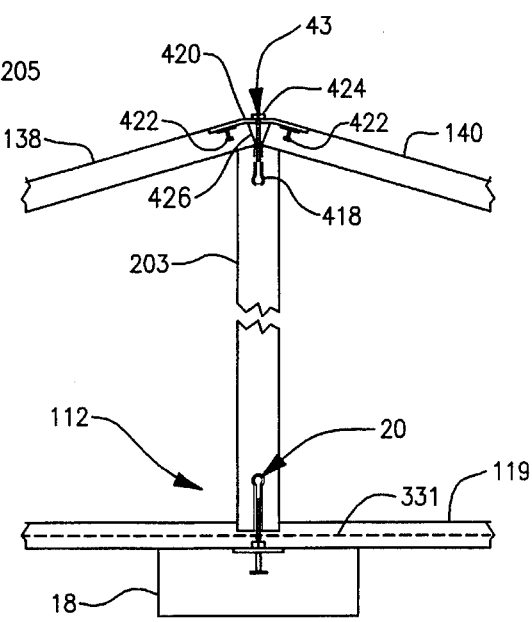
FIG. 8
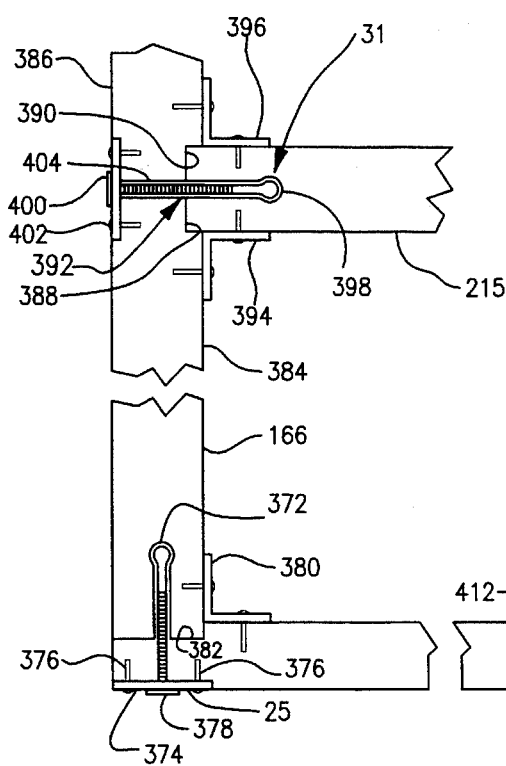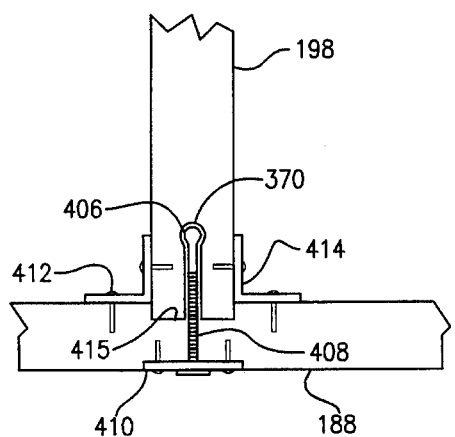
FIG. 7

WIND RESISTANT BUILDING SYSTEM

FIELD OF THE INVENTION

This invention relates to a system for constructing concrete buildings that are resistant to hurricanes and high winds.

1. Background of the Invention

Conventional building techniques are often inadequate to protect residential structures against strong hurricanes and other storms accompanied by high winds. Most wood frame homes and prefabricated structures, and even many concrete block buildings, are simply incapable of withstanding winds in excess of approximately 150 MPH. Recent disasters, most notably Hurricane Andrew, have been marked by severe structural damage, including lifted roofs and collapsed walls. The large population increases of the last few decades into hurricane prone areas, such as south Florida has exacerbated this problem.

In addition to being susceptible to wind damage, conventional wooden structures can also experience damage from problems such as insects and dry rot. These difficulties are again particularly acute in warmer climates.

2. Summary of Invention

Therefore an object of the present invention to provide a system for constructing a sturdy and durable novel building that is capable of withstanding winds of 150–200 MPH.

It is a further object of this invention to provide a concrete building wherein the walls effectively resist shifting and collapsing and the roof resists lifting even under extremely heavy wind load conditions.

It is a further object of this invention to provide a modular concrete building that can be constructed quickly and economically.

It is a further object of this invention to provide a novel concrete building that resists problems such as insect infestation and dry rot, which are commonly experienced by wood framed buildings.

It is a further object of this invention to provide a concrete building system that is particularly beneficial for use in residential construction.

This invention results from a realization that an improved wind-resistant building may be constructed by employing modular, precast concrete wall and roof panels and by securing each such wall panel to both the roof and to the foundation or base of the structure. This invention results from a further realization that the structural integrity of the building is improved even more by abutting against each wall panel one or more other wall panels at a 90° angle such that each of the wall panels is effectively braced against excessive wind loads.

This invention features a wind resistant concrete building including a concrete base section and a wall section that has a plurality of discrete concrete wall panels. Each wall panel interengages and extends substantially perpendicularly from at least one other wall panel to reinforce the wall section. There are means for fastening together each pair of interengaging wall panels. Means are also provided for securing the wall section to the base. A precast concrete roof section includes at least one roof panel that is mounted to the wall section. Means are provided for attaching the roof section to each of the wall panels of the wall section.

In a preferred embodiment, the base includes a poured concrete floor in which the wall panels are set. The base may include a concrete footer portion that is formed beneath the floor. The means for securing may include a threaded receptacle that is cast in a wall panel proximate a lower edge thereof and a threaded element that is engaged with the receptacle and has a head that engages the footer portion and a shaft that extends through the floor. The threaded element is adjusted longitudinally in the receptacle before the floor is poured to fix the height of the wall structure relative to the footer portion. The means for securing may further include a hairpin rebar element that wraps about the shaft of the threaded element and extends through the floor portion. A weld plate may be cast into the footer and the head of the threaded element may engage and be welded to the weld plate before the floor portion is poured. The means for securing may also include an L-shaped rebar element that interconnects the wall panel and the floor portion.

The wall panels preferably comprise a first group of at least one exterior wall panel defining a front wall section, a second group of at least one exterior wall panel defining a rear wall section and a pair of complementary, substantially parallel gable wall panels interconnecting the front and rear wall sections. The wall section may also include at least one interior wall panel for interengaging and extending substantially perpendicularly from an exterior wall panel toward the interior of the building. At least one interior wall portion may comprise a shear wall that is interengaged with and extends substantially perpendicularly from an exterior wall panel defining one of the front and rear wall sections.

The means for fastening may include a threaded receptacle that is cast into one of the interengaged walls and a complementary threaded element that extends through a hole in the other interengaged wall and operably engages receptacle. The roof section may include a pair of discrete, precast roof panels that are attached to the wall panels to define a gable roof having a central ridge region that extends between the gable wall panels. Means may also be provided for joining together the roof panels. At least one interior wall panel may comprise a ridge wall panel that interengages and extends substantially perpendicularly from a respective gable wall panel beneath the central ridge region. The gable wall panel may have a respective ridge wall panel interengaged therewith and extending substantially perpendicularly therefrom. An elongate precast concrete ridge beam may interconnect the ridge wall panels and may extend longitudinally beneath the central ridge region of the roof section. Complementary keyway sections may be formed in an end of the ridge beam and an adjacent edge of a ridge wall panel. The keyway sections together form a keyway that accommodates a cementitious or adhesive material for affixing the ridge beam to the ridge wall panel. Means such as interlocking or welded connections may also be provided for fastening together the ridge beam and each ridge wall panel. Means may be employed to affix the roof panels to the ridge beam.

A precast support column may interconnect the base and the ridge beam and means may be provided for interlocking a top portion of the column to the ridge beam. In such cases, means are provided for securing a lower portion of the column to the base. Preferably the lower portion of the column is set in the floor. The means for securing may also include a threaded receptacle that is cast in the column proximate the lower portion thereof and a threaded element that is engaged with the receptacle and has a head that engages the footer portion. The threaded element also includes a shaft that extends through the floor. The threaded element is longitudinally adjusted in the receptacle before the floor is poured to adjust the height of the column relative to the footer portion.

Each gable wall panel may include a pair of discrete half portions. Each half portion perpendicularly interengages the ridge wall panel associated with the gable wall panel. The means for fastening together may include a plate that interconnects respective outer surfaces of the half portions, a threaded receptacle cast in the ridge wall panel and a threaded element received through an opening in the plate and through a corresponding opening formed through the gable wall panel along a junction of the half portions. The threaded element is engaged with the receptacle and has a head that engages an outer surface of the plate to fasten together the half portions of the gable wall panel and the ridge wall panel. Each gable wall panel may also include upper and lower segments and tongue and groove means for interconnecting the upper and lower segments.

The means for attaching may include a threaded receptacle cast in the wall panel. A bolt or other threaded element is engaged with the threaded receptacle and has a shaft that extends through a roof mounting plate and a hole in the roof section aligned with the threaded receptacle. Adhesive filler means may be disposed in the hole about the shaft. Similar fasteners may be used for interconnecting the walls.

DETAILED, DESCRIPTION OF PREFERRED EMBODIMENT

Other objects, features and advantages will occur from the following description of preferred embodiments and the accompanying drawings, in which:

FIG. 3 is an elevational, cross sectional view, taken along line 3-3 of FIG. 2, of the base, an exterior wall panel, a roof panel and preferred interconnection between those elements;

FIG. 4 is an elevational, cross sectional view of an alternative preferred means for securing an exterior wall panel to the base;

FIG. 5 is an elevational, cross sectional view taken along lines 5—5 of FIG. 2;

FIG. 6 is a perspective view of the ridge beam and a supporting column for the beam;

FIG. 7 is an upper cross sectional view of the means for fastening adjacent wall panels of the building;

FIG. 8 is a cross sectional view taken along line 8—8 of FIG. 2;

Figure 1:
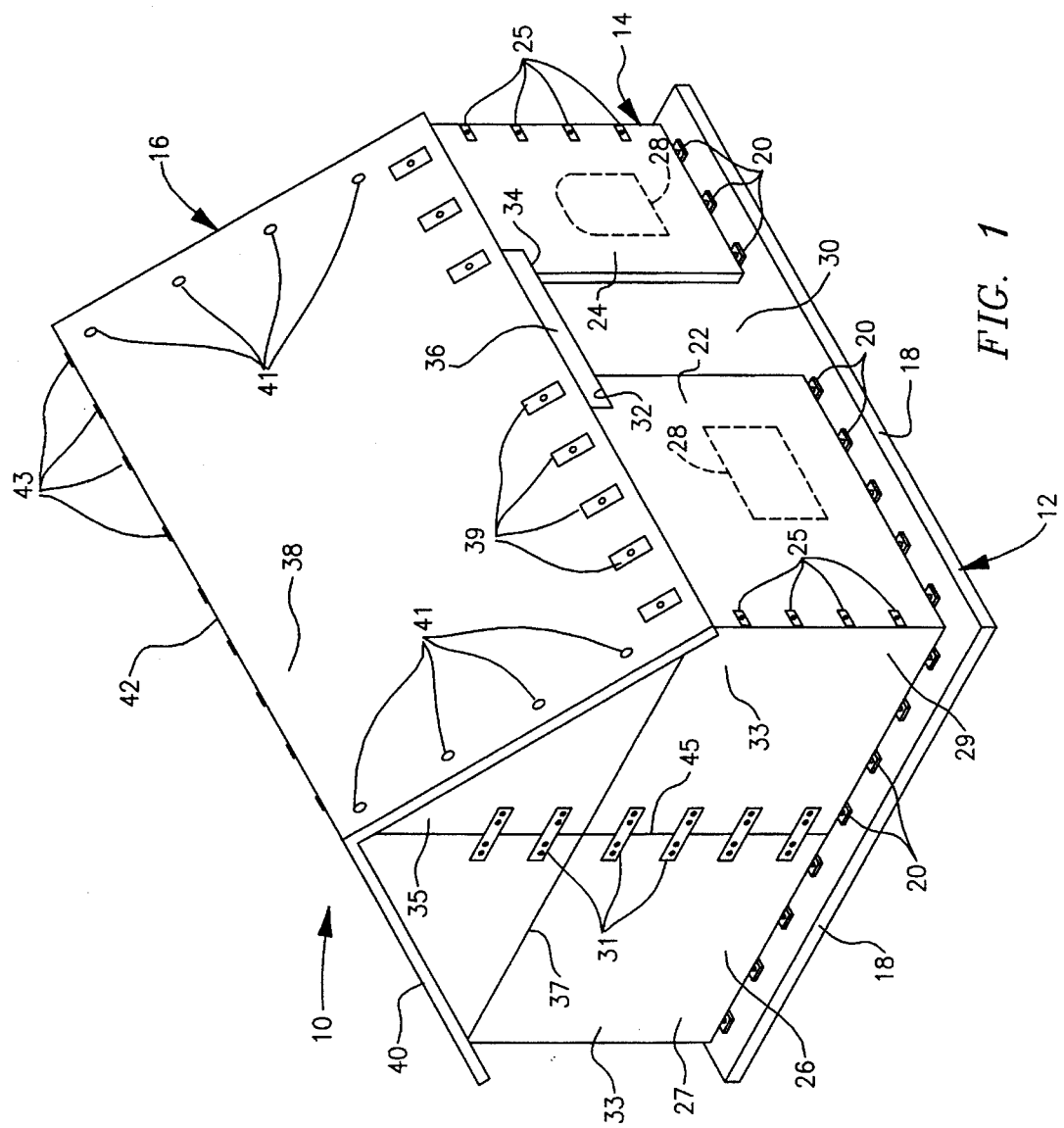
FIG. 1 is a perspective view of a preferred wind resistant concrete building according to this invention, prior to the pouring of the floor and without the addition or a garage or entryway.

There is shown in FIG. 1 a wind resistant building 10 that includes a base section 12, a wall section 14 and a roof section 16. All three sections are composed of concrete. Preferably, wall section 14 and roof section 16 comprise discrete precast panels, as will be described more fully below. In alternative embodiments, wall section 14 may include a concrete block construction. Base section 12 includes a plurality of elongate footer elements 18 that extend about the periphery of the building. The base is completed by pouring a precast concrete floor (not shown in FIG. 1) into the area defined by footer elements 18.

Wall section 14 is mounted on footers 18 by means of adjustable connecting bolts 20 that are carried by the exterior wall panels. The construction and operation of bolts 20 are described more fully below. Wall section 14 includes a pair of precast exterior wall panels 22 and 24 that define a front wall portion of the building. One or more additional exterior wall panels, obscured in FIG. 1, define a rear wall portion of the building. A first gable end wall panel 26 interconnects the front and rear wall sections. A similar gable end wall panel is formed at the opposite end of building 10 and similarly interconnects the front and rear wall sections. The front wall panels 22, 24, and similarly the unpictured rear wall panels, abut the gable end wall panels at perpendicular angles and are fastened thereto by fastening elements 25. This structure and operation are again described more fully below. Appropriate windows or other openings 28 are formed in wall panels 22 and 24, as well as in any of the other wall panels as required. Such openings may be formed when the wall panels are cast. Alternatively, if concrete block is used to create the wall panels, the openings are formed in a known manner as the block is laid. Panels 22 and 24 are separated to form a front door opening 30. The opposing inner corners of panels 22 and 24 include complementary notches 32 and 34 that receive an elongate precast beam 36. Beam 36 helps to support the precast roof section 16 and defines the upper border of doorway opening 30.

Each gable end wall panel comprises a pair of complementary half panels 27 and 29 that are secured together by a plurality of fasteners 31 that are arranged along the central vertical axis of the gable wall. Each of the half panels 27 and 29 includes a lower rectangular portion 33 and an upper triangular portion 35 that engages a respective rectangular portion through a tongue and groove interconnection 37, which is described more fully below.

Roof section 16 comprises a pair of discrete precast panels 38 and 40. The roof panels are carried by and attached to the panels of wall section 14. The means for such attachment include roof attachment elements 39 that are formed along the eaves of roof section 16 and elements 41 that are formed along the gable ends of the roof. Additional elements 43 attach the roof panels together and to interior walls and a ridge beam formed within the building. This structure is described in greater detail in connection with FIGS. 3, 8 and 10. Panels 38 and 40 join along a central ridge 42 to define a gable style roof. The ridge extends between the gable end wall panels 26.

Figure 2:
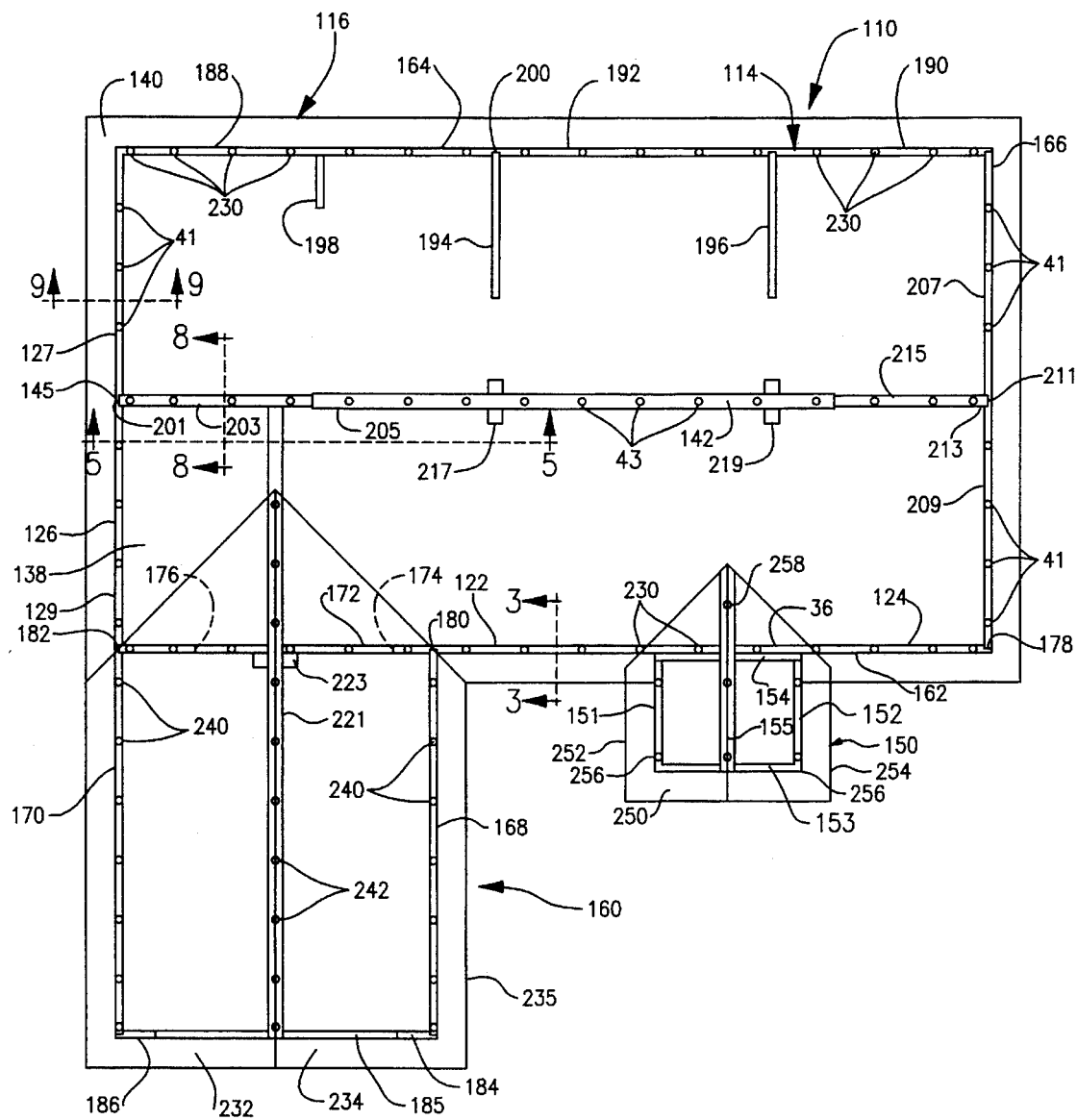
FIG. 2 is a plan view of an alternative preferred building according to this invention, which includes both an entry way and a garage.

FIG. 2 depicts an alternative wind resistant building 110 that employs a rectangular floor plan including an entryway 150 and a garage 160. A wall section 114 is mounted on a base that includes a footer analogous to footer 18 of FIG. 1. The wall section includes a front exterior wall portion 162, a rear exterior wall portion 164, and gable end wall panels 126 and 166, analogous to those previously described. Front wall section 162 includes precast concrete panels 122 and 124 that are spaced apart to form a door opening beneath the entryway 150. Panels 122 and 124 are interconnected by a beam 36. The front exterior section also includes precast garage wall panels 168 and 170. A precast interior wall panel 172 extends between front wall panel 122 and gable wall panel 126 to form the back wall of the garage 160.

At each point of engagement between adjacent walls, a notch is formed in one or more of the walls to receive the abutting wall and provide an interlocking interengagement. For example, front wall panel 124 includes a notch 178 that receives the forward end of gable end wall 166. Similarly, complementary notches 180 are formed in the abutting ends of wall panels 122 and 172 to receive the rearward end of garage panel 168. The rearward end of garage panel 170 and the forward end of gable panel 126 include complementary notches 182 that receive the opposite left-hand end of wall panel 172.

Garage 160 also includes relatively narrow front panels 184 and 186 that interengage the forward ends of side panels 168 and 170, respectively. Again, notches are provided in the panels 184 and 186 to provide an interlocking engagement. An appropriate A-frame arch beam 185 is mounted between the tops of panels 184 and 186 to define the top of the garage door opening.

Rear wall portion 164 includes precast rear wall panels 188 and 190. These rear wall panels are interconnected in the central region of the rear of the building by an 8"× 16" precast beam 192. The dimension of the beam, as well as other dimensions recited herein, may be varied as needed. The beam is interconnected between the end walls in a manner that will be described more fully below. No wall is formed beneath beam 192 so that an open patio or lanai is formed in the rear of building 110.

To reinforce the rear wall portion 164, a plurality of shear walls 194, 196 and 198 are interconnected to the rear wall panel at perpendicular angles. In particular, shear walls 194 and 196 are 6" precast walls that define the sides of the lanai. Shear wall 194 is interengaged with and fastened to the right-hand end of rear wall panel 188. In particular, the rearward end of shear wall 194 is received in a complementary notch 200 formed in wall panel 188. Similarly, wall 196 interengages the left-hand end of wall panel 190. Beam 192 interengages walls 194 and 164 at one end and walls 196 and 190 at its opposite end. A third 4" shear wall 198 interengages wall 188 and extends inwardly therefrom. Each of the shear walls extends perpendicularly from the respective wall panel that it abuts.

Gable end wall panel 126 includes half panel segments 127 and 129. These half segments abut along an axial seam 145. A notch 201 is formed in half panel segments 127 and 129 along seam 145 for receiving one end of an interior ridge wall panel 203. Panel 203 extends perpendicularly from panel 126 and partially into the interior of building 110. The ridge panel carries, at its inner end, one end of a ridge beam 205. Gable panel 166 includes a similar pair of half segments 207 and 209 that are joined along an axial vertical seam 211. The gable half panels define a notch 213 along seam 211, which receives one end of a second ridge wall panel 215. The opposite end of panel 215 carries the second end of ridge beam 205. Accordingly, beam 205 extends between ridge wall panels 203 and 215. The ridge beam is located beneath the ridge line 142 and extends above an open area (e.g. a great room) in building 110. A pair of columns 217 and 219 provide added support to ridge beam 205 in a manner that will be described below.

A precast beam 221 having a dimension of approximately 8"×24" extends between arch beam 185 and the ridge wall panel 203. At least one column 223 is erected to provide additional support for beam 221. Beam 221 is received in complementary notches formed in beam 185 column 217 and wall 203. Such a structure is analogous to that described more fully below in connection with FIGS. 5 and 6.

Entryway 150 includes a pair of precast side panels 151 and 152 that interengage exterior wall panels 122 and 124, respectively, at perpendicular angles. Forward and rearward arch beams 153 and 154 extend between wall panels 151 and 152. An entry ridge beam 155 interengages arch beams 153 and 154.

Each interior and exterior wall panel in building 110, including the garage and entryway, interengages and extends perpendicularly from at least one other wall panel. More particularly, at or proximate the end of each wall panel there is formed an abutting wall panel that extends perpendicularly therefrom. As a result, the abutting walls effectively brace one another. Moreover, each pair of abutting wall panels are fastened together in a manner that will be described more fully below. This contributes significantly to the improved structural rigidity and wind resistance of this invention.

Roof section 116 includes a main gable type roof that is carried on wall section 114. The precast roof section includes numerous dovetail blockouts 230 that are cast into the roof panels such that they correspond with receptacles formed in the upper edges of the interior and exterior wall panels. Attachment elements 39, shown in FIG. 1 and described below in connection with FIG. 3, are formed through the dovetail cut outs 230 to interconnect the roof panels 138 and 140 to wall panels 188, 190, 122, 124 and 172. The ends of panels 138 and 140 are fastened to wall panels 126 and 166 by connector elements 41, shown alone in FIG. 10. Additional connectors 43, FIG. 2, are formed along the ridge line 142 to attach the roof panels to the ridge wall panels 203 and 215 and the ridge beam 205. These elements are described more particularly in connection with FIG. 8.

As illustrated in FIG. 2, garage 160 supports a garage roof 235. This roof comprises a pair of precast garage roof panels 232 and 234 that are mounted over the garage. In particular, panel 232 extends between the upper edge of side wall panel 170 and garage ridge beam 221. Similarly, panel 234 extends between garage panel 168 and ridge beam 221. Both of the garage roof panels are supported by arch beam 185. As a result, a precast 8able roof is formed over the garage. Dovetail cutouts 240 are formed in roof panels 232 and 234 of garage 160. These dovetail cut-outs receive attachment elements that secure the garage roof panels to side walls. Additional attachment elements 242 fasten the garage roof panels 232 and 234 to garage ridge beam 221.

A precast gable roof 250 is similarly formed over the entryway, in particular, this roof includes precast panels 252 and 254. Panel 252 is supported by the upper edge of side wall 151, entry way ridge beam 155 and forward and rearward arch beams 153 and 154. Roof panel 254 is likewise supported by side wall panel 152, ridge beam 155 and forward and rearward arch beams 153 and 154.

Dovetail blockouts 256 are formed in the entryway roof panels 252 and 254 to receive connectors that attach the roof panels to the entrywall panels 151 and 152. Suitable connectors 258 attach the roof panels 252 and 254 to the entryway ridge beam 155. The garage and entry roof attachment elements are all constructed analogous to the roof attachment elements described below.

A preferred construction for interconnecting the base section, wall section and roof section is shown in FIG. 3. This view is taken along a point where roof panel 138 and footer 18 are joined to wall panel 122. Similar forms of interconnection are employed at regular intervals along each of the wall panels of the forward and rearward wall sections. Base section 112 includes footer 18 and a substantially flat, poured concrete floor 119. Initially, footer 18 is installed in a conventional manner. Then, before floor 119 is poured, wall 122 is erected. The wall carries at its lower end a plurality of adjustable connectors 20, only one of which is shown. A representative adjustable connector 20 includes an elongate threaded receptacle 310 that is cast into the lower end of wall panel 22 such that the opening of receptacle 310 is exposed on the lower edge of the wall panel. Receptacle 310 receives a threaded bolt 312 that is threadably engaged with the receptacle and depends therefrom below the bottom edge of panel 22. The head of bolt 312 is engaged with an upper surface of footer 18. More particularly, footer 18 includes a weld plate 314 that is cast into the upper surface of the footer. The head of bolt 312 engages and is welded to weld plate 314. This secures wall panel 122 to footer 18. Before the bolt is affixed to the weld plate, it is adjusted in receptacle 310 so that wall panel 122 is positioned at an appropriate height above footer 18. All of the bolts are adjusted and secured to the footer in this manner so that the wall panels are positioned above the footer as shown in FIG. 1. Next, concrete floor 119 is poured above footer 18, as shown in FIG. 3, such that the floor fills in the gap between the lower edge of wall panel 122 and the upper surface of footer 18. The floor is poured in this manner until the upper surface of the floor is disposed slightly above the lower edge of each of the wall panels. As a result, when floor 119 sets, wall panel 122, as well as the remaining wall panels, are firmly interlocked with base 112. This interlocking construction is improved even more by wrapping an elongate piece of rebar 316, FIGS. 3 and 4, about the shaft of bolt 312 before floor 119 is poured. Rebar 316 extends inwardly so that when the floor is poured and then sets, wall 122 resists any shifting laterally in the directions of arrows 318 and 320. Alternatively, as illustrated in FIG. 4, an angled L-shaped piece of rebar 322 may be initially cast in the lower end of wall panel 122. A lower leg 324 of rebar 322 extends below the lower edge of wall panel 122 and inwardly in a manner similar to rebar 316. As a result, when floor 119 is poured and set, the innerlocking interengagement between wall 122 and base 112 is improved.

As illustrated in FIG.. 3, each roof fastening element 39 includes a threaded receptacle 326 (similar to receptacle 310) that is cast in the upper edge of wall panel 122. Receptacle 326 includes a threaded opening that operably receives a threaded bolt 328. Before bolt 328 is engaged with receptacle 326, a respective roof panel 138 is mounted to the top edge of the wall panel. As previously described, roof panel 138 includes a plurality of dovetail blockout openings 230 that are cast into the panel. Each opening is aligned with an opening of a respective one of the receptacles 326. A mounting plate 330 is placed on the upper surface of the roof panel above opening 230. Plate 330 includes a bolt receiving opening that is aligned with opening 230. The plate may be set into a recess in the upper surface of the roof panel or, alternatively, may be placed on the top of upper surface. A pair of nail-in anchors 332 may be utilized to secure the plate to the roof panel. After the roof plate 330 is so secured, a threaded bolt 328 is inserted through the opening in the plate and through the roof opening 230 to threadably engage the receptacle 326. Before or after the roof mounting plate 330 is mounted, opening 230 is filled with a high strength grout 334. After the bolt is inserted through the opening and the grout sets, an improved grip is provided on the bolt so that the roof panels resist uplifting and lateral movements that may otherwise be caused by high winds.

It should be understood that a construction analogous to that described in FIG. 3 applies to each of the roof-to-wall attachment elements 39 and wall-to-base fastening elements 20.

As illustrated in FIG. 5, gable end wall panel 126 is mounted by adjustable fastening elements 20 (only one of which is shown) to base section footer 18. Wall panel 126 includes upper and lower portions 133 and 135 that are interlockably engaged along a tongue and groove joint 137. Edge 335 of ridge wall panel 203 interlocks with gable panel 126 by fitting in the notch 201 shown in FIG. 2. Edge 335 of wall panel 203 is further secured to wall panel 126 by fastening elements analogous to elements 31 shown in FIG. 1. The specific construction of such fasteners is described below in connection with FIG. 7. A layer of wire mesh 331 is contained within the poured floor. This strengthens the base and is accomplished in a known manner. The lower end 336, FIG. 5, of ridge wall panel 203 is set in concrete floor 119, which is poured after wall panel 203 is erected.

Ridge wall panel 203 extends inwardly into the building and at a perpendicular angle from wall 126. The upper right hand corner of wall panel 203 includes an L-shaped notch 338 that receives and supports one end of ridge beam 205. The ridge beam is secured firmly to the ridge wall by a variety of fastening elements. For example, panel 203 and the end of beam 205 include complementary half keyway sections 340 and 342. When the ridge beam is mounted to the ridge wall, the keyway sections correspond to form a keyway 344. This keyway is filled with concrete or other cementitious or adhesive material to secure the wall 203 to the ridge beam 205. Additionally, complementary weld plates 346 and 348 are cast respectively into the ridge wall panel 203 and the ridge beam 205. These elements may be welded together in a conventional manner to improve the interconnection between the ridge wall panel and the ridge beam. Various other forms of interconnection such as a keyed recess and joint may also be formed in the parts for this purpose.

The ridge wall panel 215 formed at the opposite end of building 110 is analogous in construction to ridge wall panel 203. Similarly, the opposite end of ridge beam 205 is supported by and attached to ridge wall panel 215 in a manner that is similar to that shown in FIG. 5.

Figure 9:
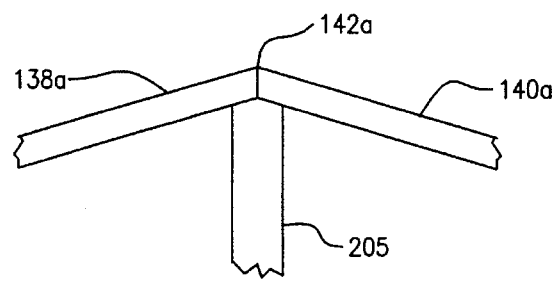
FIG. 9 is an elevational cross sectional view of the ridge beam and the roof panels.

Support column 217, FIGS. 5 and 6, comprises an elongate element that engages and supports ridge beam 205 at a point between the opposite ends of the ridge beam. The following description of column 217 applies equally to column 219, FIG. 2, which is positioned between column 217 and right hand ridge wall panel 215. Column 217 is an elongate precast concrete element preferably having a dimension of approximately 8"×24", although various alternative dimensions may be utilized. The lower end 350 of column 217 is set within poured concrete floor 119 and includes adjustable fastening elements 20 (only one of which is shown) that secure the column to a footer element 18 disposed below column 217. As a result, column 217 is attached to the base 112 in a manner similar to the gable end wall panel 126 and the exterior wall panel 122 (FIG. 3). Because the adjustable fastening element 20 is used, the height of column 217 relative to footer 18 may be adjusted when the column is erected. As best shown in FIG. 6, column 217 includes a notch 352 that accommodates beam 205. The ridge beam includes its own shallow (e.g. 1") recess 354, best shown in FIG. 5, that interengages the bottom of notch 352 to provide for a keyed joint between the beam and column. This permits the ridge beam 205 to interlock with the column 217. The upper surface 356 of column 217 and the upper surface 358 of ridge beam 205 converge and display a smooth transition so that column 217 and the ridge beam 205 conformably engage the inside surfaces of the roof panels, as shown more fully below in connection with FIGS. 8 and 9. A piece of No. 5 rebar 360 is pinned in a conventional manner into beam 205 through complementary holes formed or drilled in the beam and column 217. This helps to prevent the beam from uplifting or otherwise shifting in heavy winds.

Preferred fastening elements for interconnecting adjacent abutting wall panels of this invention are illustrated in FIG. 7. In particular, a fastening, element 25 is shown for interconnecting a pair of perpendicularly interconnecting exterior wall panels 190 and 166. A second fastening element 31 is shown for interengaging, a gable wall panel 166 and a ridge wall panel 215. Finally, an adjustable fastening element 370 is shown for fastening a 4" shear wall 198 to an exterior wall panel 188. It should be understood that analogous fastening elements are employed to interconnect the remaining wall panels of the building in a similar manner. Such fastening elements are spaced at predetermined intervals along the vertical junction of each pair of interengaging, panels.

In particular, fastening, element 25 includes a threaded metal receptacle 372 that is cast into the edge of wall panel 166 such that the opening of the threaded receptacle is exposed along the edge of the wall panel. A complementary hole in the abutting, wall panel 190 is aligned with the opening in receptacle 372. A metal plate 374 is secured to the outer surface of wall 190 or alternatively, is received in a recess in that surface. Plate 374 is secured to wall 190 by nail-in anchors 376. Plate 374 includes a hole that is likewise aligned with the hole in wall panel 190. The aligned holes receive a threaded bolt 378 that is engaged with the threads of receptacle 372 and tightened, as required, to secure together wall panels 166 and 190. To strengthen this interconnection, a metal angle plate 380 is secured by appropriate nail-in anchors to the respective wall panels 166 and 190. It should be understood that wherever nail-in anchors are employed in this invention, such structure can be replaced by conventional weld plate connections. A shallow recess 382 is formed along the edge of panel 190 to receive the abutting end of panel 166. As a result, a secure interlocking interengagement is provided between the panels. Moreover, they are formed at a precisely perpendicular angle so that each panel braces the other. This strengthens the entire structure and helps the building to resist high winds.

Fastening element 31 provides for a similar interconnection between the gable end wall panel 166 and ridge wall panel 215. Wall panel 166 includes half sections 384 and 386 that are similar to half sections 27 and 29 of FIG. I and half sections 127 and 129 in FIG. 2. A half recess 388 is formed in panel section 384 and a similar half recess 390 is formed in panel section 386. As a result, a full recess 392 is formed that receives the end of ridge wall panel 215. A pair of L-shaped angle brackets 394 and 396 interconnect panel 215 to panel sections 384 and 386, respectively. Fastening element 31 again includes a threaded receptacle 398 that receives a threaded bolt 400. The bolt is inserted through a plate 402 that interconnects the adjacent wall panel sections 384 and 386 and through a corresponding hole 404 that is formed through the seam or junction between the panel half sections 384 and 386. Again, bolt 400 may be loosened or tightened as required to provide a secure interconnection between the gable panel 166 and the ridge wall panel 215. The angle brackets 394 and 396 and the insertion of wall panel 215 into keyed recess 392 improve the rigidity between the abutting walls and provide increased resistance to disruption from high winds loads.

Fastening element 370 similarly includes a threaded receptacle 406 that receives a threaded bolt 408. The bolt is engaged with the threaded receptacle through a plate 410 that is cast, nailed or otherwise anchored into wall panel 188 and through a complementary hole formed through the wall panel. The shear wall 198 may be connected at any point along the wall panel 188 or alternatively, at a point along the junction of two abutting wall panels, in a manner similar to that described for ridge wall panel 215. Again, a pair of angle brackets 412 and 414 are anchored to both the shear wall panel 198 and the exterior wall panel 188 to increase the rigidity of the structure. Likewise, the end of the shear wall 198 is keyed into a complementary recess 415 in wall panel 188 to improve the interlocking interengagement.

As shown in FIG. 8, ridge panel 203 is secured to footer 18 and floor 119 by at least one adjustable fastening element 20. Preferably, a series of such elements interconnect the lower edge of the ridge panel with the base 112. Fastening elements 20 are arranged along the length of panel 203 in the same way that they are mounted to the exterior panels. As a result, the ridge panel is both fastened to the footer element through fastening element 20 and is set into the poured floor 119. This securely anchors the panel to the floor and resists virtually any disruption of that panel.

The upper end of ridge panel 203 is optionally beveled so that it conformably engages the inside surfaces of roof panels 138 and 140. A plurality of adjustable connecting elements 43, one of which is shown, secure the roof panels 138 and 140 to the upper edge of ridge panel 203. In particular, element 43 includes a threaded receptacle 418 that is cast into the upper edge surface of panel 203 proximate the apex thereof. An angled connecting plate 420 is placed on the upper surface of the roof such that it engages the upper surfaces of panels 138 and 140. Plate 420 may be formed in a recess in the roof panels or may be placed over the upper surface of those panels. Weld plates 422 are cast into roof panels :[38 and 140 and plate 420 is welded to weld plates 422 to hold plate 420 to the roof. An elongate threaded bolt 424 is formed through an opening in the apex of plate 420 and extends through the gap between the abutting roof panels and into the opening of receptacle 418. Bolt 424 is tightened to secure plate 420 and panels 138 and 140 to receptacle 418 and thereby to ridge panel 203. The remaining fastening elements 43 are constructed and operate in a similar manner to secure the roof panels to ridge panels 203 and 215 (FIG. 2) and to ridge beam 205 (FIGS. 5 and 6). Additional fastening elements 20 (FIG. 8) operate in the manner previously described to similarly interconnect ridge panel 203 (and similarly panel 215) to base 112.

In FIG. 8 the abutting roof panels 138 and 140 include side edges that are generally perpendicular to their broad flat surfaces. As a result, a generally V-shaped gap 426 is formed between the abutting roof panels. In the alternative embodiment illustrated in FIG. 9, the upper edge surfaces of the roof panels 138a and 140a are sloped slightly such that a flush ridge line 142a is formed. Appropriate roof attachment elements 43 (FIG. 8) are employed to interconnect these abutting roof panels to the ridge beam 205 and to each other. In such embodiments, an opening for accommodating the bolt 424 of fastening element 43 is provided through the abutting roof panels and, more particularly, through the seamless ridge line 142a into either ridge beam 205 or the adjoining ridge wall panels.

Figure 10:
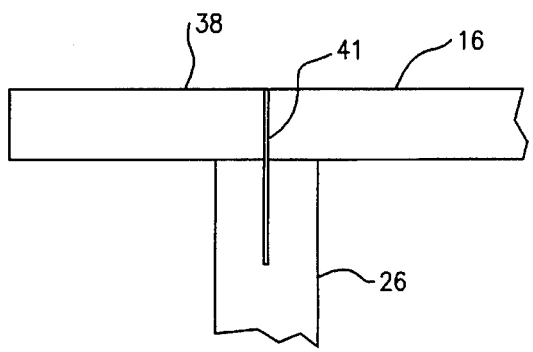
FIG. 10 is a cross sectional view of the roof panel at the gable end wall and a rebar element for interconnecting those two elements.

Roof section 16 is also interconnected to gable panels 26 between the ridge line and the eaves in the manner illustrated in FIG. 10. In particular, a plurality of No. 5 rebar connectors 41 are inserted into complementary holes drilled in gable panel 26 and roof panel 38. A suitable epoxy is introduced into the hole formed into the wall panel 26 before the rebar element 41 is inserted into the hole. When this epoxy hardens, an improved attachment is provided between the wall panel and the roof panel. Six such connections are typically formed on each gable end of the house, with three such connections being formed between each roof panel and its respective gable end wall.

Figure 11:
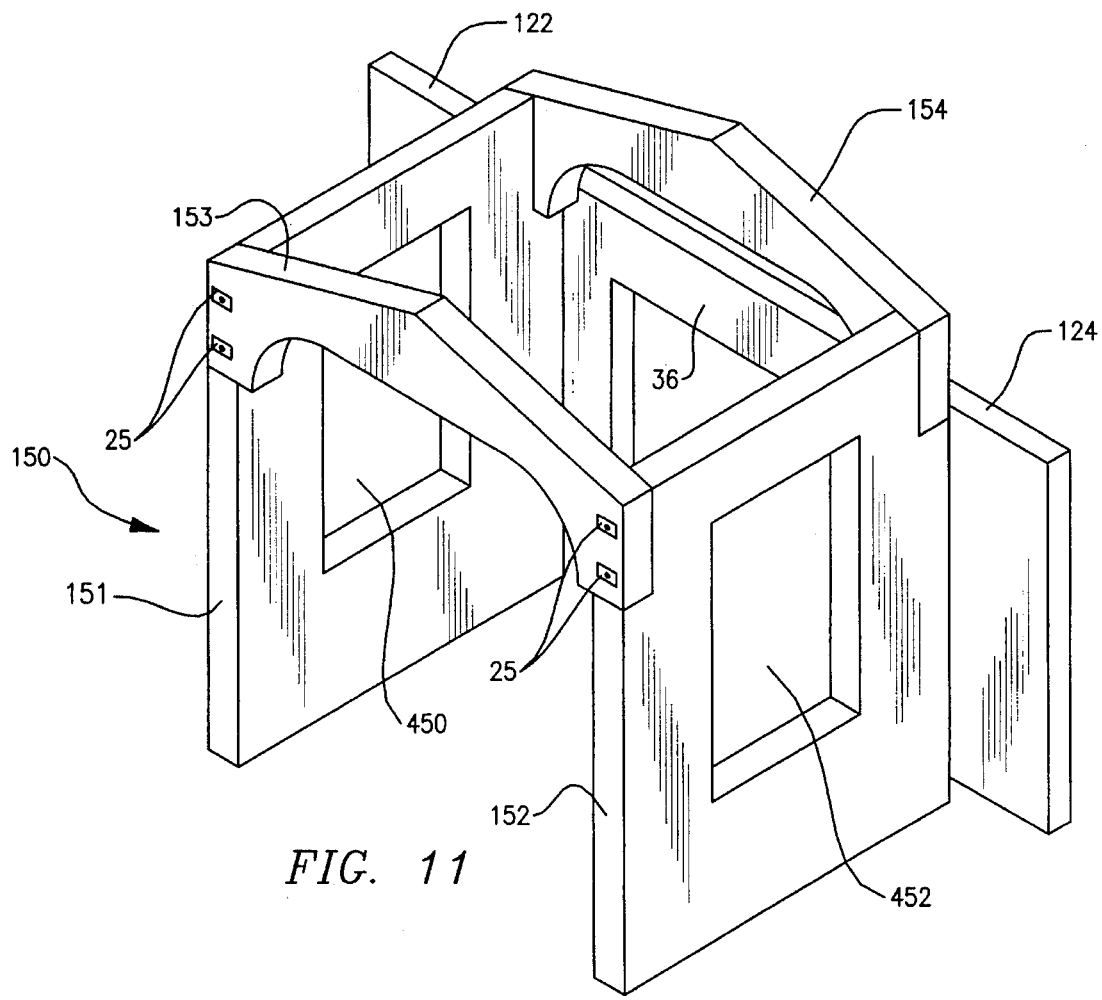
FIG. 11 a perspective view of a preferred entryway for the wind resistant building.

As shown in FIG. 11, side walls 151 and 152 of entryway 150 interengage and extend perpendicularly outwardly from exterior wall panels 122 and 124. Fastening elements that are analogous to elements 25 in FIGS. 1, 2 and 7, are employed to interconnect side walls 151 and 152 with the exterior walls of the house. As a result, the side walls effectively form bracing shear walls which improve wind resistance of the structure. Alternatively, if an entryway is not employed, perpendicular interior shear walls should be attached to the exterior panels 122 and 124 to provide the necessary bracing and wind resistance. Cross beams 153 and 154 likewise employ fastening elements 25 to secure those beams to the side walls 151 and 152. Cross beam 36 between door panels 122 and 124 forms the upper boundary of the doorway opening. This beam is attached to the door panels in the manner previously described for mounting ridge beam 205. Optional openings 450 and 452 are cast into respective side walls 151 and 152. The optional entry ridge beam is omitted for clarity in FIG. 11.

Weld plate connections may be substituted for one or more of the threaded wall to wall, roof to wall or base to wall connections described above.

Accordingly, the building of this invention employs adjustable fastening elements or equivalent structure to permanently secure the base footers to all exterior and interior walls and to similarly interconnect all such walls with the precast roof. Furthermore, each of the interior and exterior concrete wall panels is interengaged with one and preferably two other wall panels at respective perpendicular angles to provide bracing resistance against heavy wind loads. The use of the adjustable fasteners and other features of this invention further improves the rigidity of the interconnection between the walls and the overall strength of the structure.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A wind resistant concrete building comprising:

a concrete base section;

a wall section including a plurality of discrete concrete wall panels, each said wall panel interengaging and extending substantially perpendicularly from at least one other said wall panel to reinforce said wall section;

means for fastening together each said pair of interengaging wall panels;

means for securing said wall section to said base section;

a concrete roof section including at least one precast roof panel that is mounted to said wall section; and means for attaching said roof section to each of said wall panels;

said base section including a poured concrete floor in which said wall panels are set and a concrete footer portion formed at least partly beneath said floor;

said means for securing including a threaded receptacle that is cast in a said wall panel proximate a lower edge thereof and a threaded element that is engaged with said receptacle and has a head that engages said footer portion and a shaft that extends through said floor, said threaded element being longitudinally adjusted in said receptacle before said floor is poured to adjust the height of said wall structure relative to said footer portion;

said means for securing further including a weld plate cast into said footer, said head of said threaded element engaging and being welded to said weld plate before said floor portion is poured.

2. A wind resistant concrete building comprising:

a concrete base section;

a wall section including a plurality of discrete concrete wall panels, each said wall panel interengaging and extending substantially perpendicularly from at least one other said wall panel to reinforce said wall section;

means for fastening together each said pair of interengaging wall panels;

means for securing said wall section to said base section;

a concrete roof section including at least one precast roof panel that is mounted to said wall section;

means for attaching said roof section to each of said wall panels;

said wall panels comprising a first group of at least one exterior wall panel defining a front portion, a second group of at least one exterior wall panel defining a rear portion and a pair of complementary, substantially parallel gable wall panels interconnecting said front and rear wall portions;

said roof section including a pair of discrete, precast roof panels that are attached to said wall panels and defining a gable roof having a central ridge region that extends between said gable wall panels;

said wall section further including at least one interior wall panel for interengaging and extending substantially perpendicularly from an exterior wall panel toward the interior of said building;

at least one said interior wall panel comprising a ridge wall panel that interengages and extends substantially perpendicularly from a respective said gable wall panel beneath said central ridge region;

each said gable wall panel having a respective said ridge panel interengaged therewith and extending substantially perpendicularly therefrom and further including an elongate precast concrete ridge beam that interconnects said ridge wall panels and extends longitudinally beneath said central ridge region of said roof section; and a precast support column that interconnects said base and said ridge beam, means for interlocking a top portion of said column to said ridge beam and means for securing a lower portion of said column to said base; said base including a poured concrete floor in which said column is set and a footer that supports said floor, said means for securing said column to said base including a threaded receptacle that is cast in said column proximate said lower portion thereof and a threaded element that is engaged with said receptacle and has a head that engages said footer portion and a shaft that extends through said floor, said receptacle element being longitudinally adjusted in said receptacle before said floor is poured to adjust the height of said column relative to said footer portion.

3. A wind resistant concrete building comprising:

a concrete base section;

a wall section including a plurality of discrete concrete wall panels, each said wall panel interengaging and extending substantially perpendicularly from at least one other said wall panel to reinforce said wall section;

means for fastening together each said pair of interengaging wall panels;

means for securing said wall section to said base section;

a concrete roof section including at least one precast roof panel that is mounted to said wall section; and means for attaching said roof section to each of said wall panels;

said wall panels comprising a first group of at least one exterior wall panel defining a front portion, a second group of at least one exterior wall panel defining a rear portion and a pair of complementary, substantially parallel gable wall panels interconnecting said front and rear wall portions;

said roof section including a pair of discrete, precast roof panels that are attached to said wall panels and defining a gable roof having a central ridge region that extends between said gable wall panels;

said wall section further including at least one interior wall panel for interengaging and extending substantially perpendicularly from an exterior wall panel toward the interior of said building;

at least one said interior wall panel comprising a ridge wall panel that interengages and extends substantially perpendicularly from a respective said gable wall panel beneath said central ridge region;

said gable wall panel including a pair of discrete half portions, each said half portion perpendicularly interengaging said ridge wall panel associated with said gable wall panel, said means for fastening together including a plate that interconnects respective outer surfaces of said half portions, a threaded receptacle cast in said ridge wall panel, a threaded element received through a hole in said plate and a corresponding hole formed through said gable wall panel along a junction of said half portions, said threaded element being engaged with said receptacle and having a head that engages an outer surface of said plate to fasten together said half portions of said gable wall panel and said ridge wall panel.

4. A wind resistant concrete building comprising:

a concrete base section;

a wall section including at least one pair of discrete interengaged concrete wall panels;

means for fastening together each said pair of interengaged wall panels;

means for securing said wall section to said base section;

a concrete roof section including at least one precast roof panel that is mounted to said wall section;

means for attaching said roof section to each of said wall panels;

said wall panels comprising a first group of at least one exterior wall panel defining a front wall portion, a second group of at least one exterior wall panel defining a rear wall portion and a pair of complementary, substantially parallel gable wall panels interconnecting said front and rear wall portions;

said roof section further including a pair of discrete, precast roof panels that are attached to said wall panels and defining a gable roof having a central ridge region that extends between said gable wall panels;

ridge supporting means extending between said gable wall panels and beneath said central ridge region; and means for attaching said roof panels to said ridge supporting means, including a threaded receptacle cast in said ridge supporting means, a threaded element that extends between said roof panels and is engaged with said receptacle, a pair of weld plates cast respectively in said roof panels and a connecting plate attached to said threaded element and welded to each of said weld plates.

5. The building of claim 4 in which said ridge supporting means include an elongate precast concrete ridge beam.

6. The building of claim 5 in which said ridge supporting means include a ridge wall panel that interengages and extends substantially perpendicularly from a respective gable wall panel beneath said central region for supporting a respective end of said ridge beam.

7. The building of claim 4 wherein a gap is formed between said roof panels, said threaded element extending through said gap and said gap being filled with an adhesive agent.

8. The building of claim 4 in which said base section includes a poured concrete floor in which said wall panels are set and a concrete footer portion formed at least partly beneath said floor.

9. The building of claim 8 in which said means for securing include a threaded receptacle that is cast in a said wall panel proximate a lower edge thereof and a threaded element that is engaged with said receptacle and has a head that engages said footer portion and a shaft that extends through said floor, said threaded element being longitudinally adjusted in said receptacle before said floor is poured to adjust the height of said wall structure relative to said footer portion.

10. The building of claim 9 in which said means for securing further includes a hairpin rebar element that wraps about said shaft of said threaded element and extends through said floor portion.

11. The building of claim 8 in which said means for securing include an L-shaped rebar element that interconnects a said wall panel and said floor portion.

12. The building of claim 4 in which each said gable wall panel has a respective said ridge wall panel interengaged therewith and extending substantially perpendicularly therefrom and further including an elongate precast concrete ridge beam that interconnects said ridge wall panels and extends longitudinally beneath said central ridge region of said roof section.

13. The building of claim 12 further including a precast support column that interconnects said base and said ridge beam, means for interlocking a top portion of said column to said ridge beam and means for securing a lower portion of said column to said base.

14. The building of claim 4 in which at least one said interior wall panel comprises a shear wall that is interengaged with and extends substantially perpendicularly from an exterior wall panel defining one of said front and rear wall sections.

15. The building of claim 4 in which a said gable wall panel includes upper and lower segments and tongue and groove means for interconnecting said upper and lower segments.

* * * * *